US008069170B2

(12) United States Patent
Matsuyama et al.

(10) Patent No.: US 8,069,170 B2
(45) Date of Patent: Nov. 29, 2011

(54) PRIVATE INFORMATION STORAGE DEVICE AND PRIVATE INFORMATION MANAGEMENT DEVICE

(75) Inventors: Shinako Matsuyama, Tokyo (JP); Kenzo Akagiri, Kanagawa (JP); Koji Suginuma, Tokyo (JP)

(73) Assignee: Sony Corporation, Tokyo (JP)

( * ) Notice: Subject to any disclaimer, the term of this patent is extended or adjusted under 35 U.S.C. 154(b) by 1044 days.

(21) Appl. No.: 10/963,433

(22) Filed: Oct. 12, 2004

(65) Prior Publication Data
US 2005/0131949 A1 Jun. 16, 2005

(30) Foreign Application Priority Data

Oct. 10, 2003 (JP) ................................ 2003-352896

(51) Int. Cl.
*G06F 17/30* (2006.01)
*G06F 7/00* (2006.01)
(52) U.S. Cl. ....................................... 707/733; 704/231
(58) Field of Classification Search .................... 707/10, 707/104.1
See application file for complete search history.

(56) References Cited

U.S. PATENT DOCUMENTS

| | | | | |
|---|---|---|---|---|
| 6,460,036 B1 * | 10/2002 | Herz | | 707/10 |
| 6,574,614 B1 * | 6/2003 | Kesel | | 706/52 |
| 6,687,608 B2 * | 2/2004 | Sugimoto et al. | | 701/207 |
| 6,708,150 B1 | 3/2004 | Hirayama et al. | | |
| 6,741,969 B1 * | 5/2004 | Chen et al. | | 705/14.27 |
| 7,085,747 B2 * | 8/2006 | Schaffer et al. | | 706/12 |
| 7,126,558 B1 * | 10/2006 | Dempski | | 345/8 |
| 7,904,334 B2 * | 3/2011 | Chen et al. | | 705/14.4 |
| 2001/0032212 A1 | 10/2001 | Sano | | |
| 2001/0037203 A1 | 11/2001 | Satoh | | |

(Continued)

FOREIGN PATENT DOCUMENTS
EP 0701256 A2 3/1996
(Continued)

OTHER PUBLICATIONS

Romero et al, HyperReal: A Hypermedia Model for Mixed Reality, Aug. 30, 2003, ACM.*

(Continued)

*Primary Examiner* — Luke S Wassum
(74) *Attorney, Agent, or Firm* — Wolf, Greenfield & Sacks, P.C.

(57) ABSTRACT

The events experienced are stored automatically, so that the information of higher utility for a user may be taken out with responsiveness and efficiency higher than is possible with a technique of keyword retrieval over a network. An information registration unit 10 includes an information acquisition unit 11, for acquiring the empirical information, a private information adding unit 12, for adding the private information, a data recognition processing unit 13, for recognizing the acquired information, a data definition processing unit 14, for classifying the recognized data in accordance with the preset definitions, a data storage unit 15 for storage of the classified data, and a data processing unit 22 for generating the predictive information inferable from the empirical information and the private information. The information exploitation unit 30 includes an information acquisition unit 31, for acquiring the current state, a retrieval inputting unit 32, supplied with the retrieval conditions, a data recognition processing unit 33, for recognizing the acquired information, a retrieving unit 34, for extracting the information fitted to the retrieval conditions or the analogous information from the data storage unit 15, and an information presenting unit 35 for presenting the extracted information to the user.

19 Claims, 14 Drawing Sheets

U.S. PATENT DOCUMENTS

| | | | |
|---|---|---|---|
| 2002/0010759 A1* | 1/2002 | Hitson et al. | 709/219 |
| 2002/0040326 A1* | 4/2002 | Spratt | 705/26 |
| 2002/0055970 A1 | 5/2002 | Noro | |
| 2002/0069243 A1* | 6/2002 | Raverdy et al. | 709/203 |
| 2002/0087266 A1* | 7/2002 | Sugimoto et al. | 701/207 |
| 2002/0102966 A1* | 8/2002 | Lev et al. | 455/412 |
| 2002/0104002 A1 | 8/2002 | Nishizawa et al. | |
| 2003/0061183 A1* | 3/2003 | Schaffer et al. | 706/8 |
| 2003/0115113 A1* | 6/2003 | Duncan | 705/26 |
| 2003/0204396 A1 | 10/2003 | Wakita et al. | |
| 2004/0071315 A1* | 4/2004 | Neely | 382/103 |
| 2004/0203863 A1* | 10/2004 | Huomo | 455/456.1 |
| 2004/0215517 A1* | 10/2004 | Chen et al. | 705/14 |
| 2005/0065851 A1* | 3/2005 | Aronoff et al. | 705/15 |
| 2005/0117476 A1 | 6/2005 | Katsuta et al. | |
| 2005/0138016 A1 | 6/2005 | Matsuyama et al. | |
| 2005/0193012 A1 | 9/2005 | Matsuyama et al. | |
| 2008/0040194 A1* | 2/2008 | Trauth | 705/10 |
| 2008/0214210 A1* | 9/2008 | Rasanen et al. | 455/456.3 |
| 2011/0173062 A1* | 7/2011 | Chen et al. | 705/14.35 |

FOREIGN PATENT DOCUMENTS

| | | |
|---|---|---|
| EP | 0898278 A2 | 2/1999 |
| EP | 1293912 A2 | 3/2003 |
| JP | 09-212518 | 8/1997 |
| JP | 2000-305941 A | 11/2000 |
| JP | 2000-348039 A | 12/2000 |
| JP | 2002-010178 A | 1/2002 |
| JP | 2002-324071 | 11/2002 |
| JP | 2002-324071 A | 11/2002 |
| JP | 2003-029863 A | 1/2003 |
| JP | 2003-030234 | 1/2003 |
| JP | 2003-030234 A | 1/2003 |
| WO | WO 97/05616 | 2/1997 |
| WO | WO 02/33555 A1 | 4/2002 |

OTHER PUBLICATIONS

Schmidt, There is More to Context Then Location, MIC, 1998, pp. 893-901.*

Chincholle, Lost or Found? A Usability Evaluation of a Mobile Navigation and Location-Based Service, 2002, pp. 211-224.*

Middleton, Capturing Knowledge of User Preferences with Recommender Systems, May 2003, pp. 9-113.*

* cited by examiner

| EMPIRICAL INFORMATION No. | DATE | LATITUDE | LONGITUDE | ALTITUDE | WEATHER | ATMOSPHERIC TEMPERATURE | HUMIDITY | ... |
|---|---|---|---|---|---|---|---|---|
| ... | | | | | | | | |
| XYZ | 20037101130 | XXXXXX | XXXXXX | XXX | RAINY | 28°C | 40% | |
| ... | | | | | | | | |

| PRIVATE INFORMATION No. | EVALUATION | CONDITION OF SITE | SALESPEOPLE | COMMODITY (MENU) | TASTE | ATMOSPHERE | PRICING | PRESENTATION TIME | OTHERS |
|---|---|---|---|---|---|---|---|---|---|
| ... | | | | | | | | | |
| XYZ | ACCEPTABLE | BAD | ACCEPTABLE | ACCEPTABLE | GOOD | ACCEPTABLE | GOOD | GOOD | |
| ... | | | | | | | | | |

| EMPIRICAL INFORMATION No. | DATE | LATITUDE | LONGITUDE | ALTITUDE | WEATHER | ATMOSPHERIC TEMPERATURE | HUMIDITY | ... |
|---|---|---|---|---|---|---|---|---|
| ... | | | | | | | | |
| XYZ | | XXXXXX | XXXXXX | XXX | FINE | 28°C | 40% | |
| ... | | | | | | | | |
| | | | | | | | | |

| PRIVATE INFORMATION No. | EVALUATION | CONDITION OF SITE | SALESPEOPLE | COMMODITY (MENU) | TASTE | ATMOSPHERE | PRICING | PRESENTATION TIME | OTHERS |
|---|---|---|---|---|---|---|---|---|---|
| ... | | | | | | | | | |
| XYZ | GOOD | BAD | ACCEPTABLE | ACCEPTABLE | GOOD | ACCEPTABLE | GOOD | GOOD | |
| ... | | | | | | | | | |

| EMPIRICAL INFORMATION No. | DATE | LATITUDE | LONGITUDE | ALTITUDE | WEATHER | ATMOSPHERIC TEMPERATURE | HUMIDITY | ... |
|---|---|---|---|---|---|---|---|---|
| ... | | | | | | | | |
| XYZ | XXXXXXX1800 | XXXXXX | XXXXXX | XXX | RAINY | 28°C | 40% | |
| ... | | | | | | | | |

| PRIVATE INFORMATION No. | EVALUATION | CONDITION OF SITE | SALESPEOPLE | COMMODITY (MENU) | TASTE | ATMOSPHERE | PRICING | PRESENTATION TIME | OTHERS |
|---|---|---|---|---|---|---|---|---|---|
| ... | | | | | | | | | |
| XYZ | BEST | BAD | ACCEPTABLE | ACCEPTABLE | GOOD | BEST | GOOD | GOOD | |
| ... | | | | | | | | | |

FIG.6

| EMPIRICAL INFORMATION No. | DATE | LATITUDE | LONGITUDE | ALTITUDE | WEATHER | ATMOSPHERIC TEMPERATURE | HUMIDITY | ... |
|---|---|---|---|---|---|---|---|---|
| ... | | | | | | | | |
| AAA | 200307221730 | 605958 | 1354536 | 546 | FINE | 32°C | 40% | |
| ... | | | | | | | | |

FIG.9

| PRIVATE INFORMATION No. | EVALUATION | CONDITION OF SITE | SALESPEOPLE | COMMODITY (MENU) | TASTE | ATMOSPHERE | PRICING | PRESENTATION TIME | OTHERS |
|---|---|---|---|---|---|---|---|---|---|
| ... | | | | | | | | | |
| AAA | GOOD | BAD | ACCEPTABLE | ACCEPTABLE | GOOD | BEST | GOOD | GOOD | |
| ... | | | | | | | | | |
| | | | | | | | | | |

FIG.10

| CURRENT INFORMATION No. | DATE | LATITUDE | LONGITUDE | ALTITUDE | WEATHER | ATMOSPHERIC TEMPERATURE | HUMIDITY | ... |
|---|---|---|---|---|---|---|---|---|
| ... | | | | | | | | |
| BBB | 20030831210 | 585920 | 1354240 | 520 | CLOUDY | 29°C | 60% | |
| ... | | | | | | | | |
| | | | | | | | | |

FIG.11

| ITEM | ATMOSPHERE | PLACE |
|---|---|---|
| KEYWORD FOR DETECTION | GOOD | RESTAURANT |

| RETRIEVING INFORMATION No. | DATE | LATITUDE | LONGITUDE | ALTITUDE | WEATHER | ATMOSPHERIC TEMPERATURE | HUMIDITY | ATMOSPHERE | PLACE |
|---|---|---|---|---|---|---|---|---|---|
| BBB | 20030831210 | 585920 | 1354240 | 520 | CLOUDY | 29°C | 60% | GOOD | RESTAURANT |

FIG. 14

RETRIEVED RESULT DISPLAY

<RETRIEVING CONDITION>

| ITEM | ATMOSPHERE | PLACE |
|---|---|---|
| KEYWORD FOR DETECTION | GOOD | RESTAURANT |

<CURRENT DATA>

| RETRIEVING INFORMATION No. | DATE | LATITUDE | LONGITUDE | ALTITUDE | WEATHER | ATMOSPHERIC TEMPERATURE | HUMIDITY | PLACE |
|---|---|---|---|---|---|---|---|---|
| BBB | 20030831210 | 585920 | 1354240 | 520 | CLOUDY | 29°C | 60% | RESTAURANT |

<PAST DATA>

| RESULTS No. | | | | | | | | | |
|---|---|---|---|---|---|---|---|---|---|
| 001 | STORE NAME | DATE | LATITUDE | LONGITUDE | ALTITUDE | WEATHER | ATMOSPHERIC TEMPERATURE | HUMIDITY | PLACE |
| | ○○-SHOP | 20030721730 | 605958 | 1354536 | 546 | FINE | 32°C | 40% | OTHERS |
| | PLACE | EVALUATION | CONDITIONS OF SITE | SALESPEOPLE | COMMODITY (MENU) | TASTE | ATMOSPHERE | PRICING | PRESENTATION TIME |
| | ALIGHT AT ○○-STATION | GOOD | BAD | ACCEPTABLE | ACCEPTABLE | GOOD | BEST | GOOD | GOOD |
| 002 | STORE NAME | DATE | LATITUDE | LONGITUDE | ALTITUDE | WEATHER | ATMOSPHERIC TEMPERATURE | HUMIDITY | PLACE |
| | ××-SHOP | 20030418130 | 605000 | | 134 | FINE | 23°C | 56% | OTHERS |
| | PLACE | EVALUATION | CONDITIONS OF SITE | SALESPEOPLE | COMMODITY (MENU) | TASTE | ATMOSPHERE | PRICING | PRESENTATION TIME |
| | ALIGHT AT ××-STATION | GOOD | GOOD | GOOD | ACCEPTABLE | GOOD | GOOD | BEST | GOOD |
| 003 | STORE NAME | DATE | LATITUDE | LONGITUDE | ALTITUDE | WEATHER | ATMOSPHERIC TEMPERATURE | HUMIDITY | PLACE |
| | ※※-SHOP | 20030615210 | 594242 | 1364632 | 502 | RAINY | 26°C | 67% | OTHERS |
| | PLACE | EVALUATION | CONDITIONS OF SITE | SALESPEOPLE | COMMODITY (MENU) | TASTE | ATMOSPHERE | PRICING | PRESENTATION TIME |
| | ···JAPANESE NOODLE | GOOD | GOOD | BEST | GOOD | BEST | GOOD | GOOD | GOOD |
| 004 | STORE NAME | DATE | LATITUDE | LONGITUDE | ALTITUDE | WEATHER | ATMOSPHERIC TEMPERATURE | HUMIDITY | PLACE |
| | AAX | 20030710172 | 614258 | 1353654 | 496 | FINE | 29°C | 45% | OTHERS |
| | PLACE | EVALUATION | CONDITIONS OF SITE | SALESPEOPLE | COMMODITY (MENU) | TASTE | ATMOSPHERE | PRICING | PRESENTATION TIME |
| | ···PARK | BEST | GOOD | ACCEPTABLE | GOOD | GOOD | GOOD | GOOD | GOOD |
| 005 | STORE NAME | DATE | LATITUDE | LONGITUDE | ALTITUDE | WEATHER | ATMOSPHERIC TEMPERATURE | HUMIDITY | PLACE |
| | zzz | xx1800 (FORECAST) | xxxxxx | xxxxxx | xxx | FINE (FORECAST) | 28°C | 40% | OTHERS |
| | PLACE | EVALUATION | CONDITIONS OF SITE | SALESPEOPLE | COMMODITY (MENU) | TASTE | ATMOSPHERE | PRICING | PRESENTATION TIME |
| | ···PARK | BEST (FORECAST) | BAD | ACCEPTABLE | ACCEPTABLE | GOOD | BEST (FORECAST) | GOOD | GOOD |

PRIVATE INFORMATION STORAGE DEVICE AND PRIVATE INFORMATION MANAGEMENT DEVICE

BACKGROUND OF THE INVENTION

1. Field of the Invention

This invention relates to a private information storage device and a private information management device in which the information pertinent to the event experienced by a user and the information privately required by the user are stored in a correlated fashion.

This application claims priority of Japanese Patent Application No. 2003-352896, filed on Oct. 10, 2003, the entirety of which is incorporated by reference herein.

2. Description of Related Art

Recently, with the progress in the network structure, such as the so-called Internet, and with the widespread use of a large-capacity recording medium, an environment is being created for providing or acquiring the voluminous information. In keeping up therewith, a large variety of information providing services have been proposed and, in these information providing services, attempts are being made for handling a large quantity of the information efficiently and efficaciously.

As an example, the information providing party extracts the taste of each user as an information accepting party to feature each individual to supply the information or services best fitted to each such individual (personalization of the information provided). This technique is used in online services allowing for purchase of articles of commerce from a site on the Internet. By introducing the information personalization, the services which allow for purchase of books on the Internet have realized the function of presenting recommended books to a user who purchased a book, from a list of works of the author of the book purchased by the user, the function of presenting other books purchased by other users who purchased the same book as that purchased by the user, the function of the apprising other users of the information the user feels useful for these other users.

The party accepting the information (the party browsing the information) is able to change the operating conditions or setting according to the taste of the user (customization). For example, the responsive properties of a mouse, the window coloring or the fonts can be changed.

Such as system which, by the above information personalization or customization, enables the efficient and efficacious use of the information, has already been known. As a developing phase of the personalization, such techniques as real-time profiling of the user's behavior on the network, learning the user's operating habit to provide the user with the GUI suited to the user's taste, or monitoring the user's reaction to observe the taste or the reaction of the user to the contents recommended by an agent.

As described above, the so-called push-type information furnishing, in which the information supplied by the provider is tailored to the individual user to provide a party desiring the information or services with the optimum information, becomes possible, while the party accepting the information may acquire the desired information extremely readily.

However, for tailoring the information provided to each individual (personalization), the information provider has to collect the individual-level information, by enquetes, through paper medium or Internet sites, or to collect the behavior hysteresis (purchase hysteresis of books in the above example) of the individual users. Among the information providing services, employing the Internet, there is such a service consisting in collecting the fee information pertinent to a marriage ceremony, a reception hall, an English school or a variety of culture schools, or the information pertinent to the atmosphere or service contents, from those who utilized these in the past, such as by enquetes, fitting the collected results to the rules already determined, and by displaying together the matched information, that is, the information pertinent to establishments or the experience information from the user, on a display image surface, to provide a latent user with the information in determining the establishments or the service providers.

If, in these information providing services, the information is to be made available among plural users, the retrieving step in retrieving the desired information from a large quantity of the text information is simplified by having the user intending to lay open his/her experience data furnish the information, depending on the experience level, and by visualizing the collected experience data of the users in order for the user retrieving the information to acquire the information of high fidelity (information close to the desired information), as disclosed for example in Patent Publication 1.

In the technique described in this Patent Publication 1, the majority of the information, collected from those who already exploited the ceremony halls and reception halls, is the text information, and hence it is difficult to recognize readily whether or not the information contents on which the user places emphasis are contained in the text information furnished. Thus, with the conventional system, a large quantity of the text information, which inherently is not needed, has to be read, such that it is frequently difficult to find the information needed by the user.

The majority of the techniques for tailoring the furnished information to the individual (personalization) consist in the information provider using intricate artifices to extract a user taste model. These conventional techniques are used for information management for such cases where services desired by the individual users are provided, or where the information is co-owned by plural users. However, these techniques do not reflect variegated tastes of the individual users in need of the information.

[Patent Publication 1] Japanese Laid-Open Patent Publication 2003-16202

SUMMARY OF THE INVENTION

It is an object of the present invention to provide a private information storage device and a private information management device in which the information pertinent to the event experienced by the user is stored and managed so as to be read out, whereby the information may be taken out with higher responsiveness than with the technique of keyword retrieval over the network, while the selected information may be taken out from the extracted information more efficaciously, and the information taken out is highly useful for the user.

In one aspect, the present invention provides a private information storage device including information acquisition means for acquiring experience information pertinent to an event experienced by a user; private information adding means for adding private information, privately needed by the user, to the acquired experience information; information inferring means for generating predictive information inferable from the experience information and the private information; and storage means for putting the experience information, the private information and the predictive information into order for enabling the retrieval and for storing the three information thus put into order therein.

In another aspect, the present invention provides a method for storing the private information including acquiring experience information pertinent to an event experienced by a user; adding private information privately needed by the user to the experience information acquired; generating predictive information inferable from the experience information and the private information; and putting the experience information, the private information and the predictive information into order for permitting retrieval to store the three information thus put into order therein.

In a further aspect, the present invention provides a private information management device including information acquisition means for acquiring experience information pertinent to an event experienced by a user; private information adding means for adding private information, privately needed by a user, to the experience information acquired; information inferring means for generating predictive information inferable from the experience information and the private information; storage means for putting the experience information, the private information and the predictive information into order for enabling retrieval to store the three information thus pit into order therein; retrieval inputting means for inputting a retrieval condition by the user; information presenting means for presenting information to the user; and information retrieval presentation controlling means for retrieving the fitting information from the experience information, the private information and the predictive information stored in storage means, based on the retrieval condition entered by the retrieval inputting means, to present the retrieved information to the information presenting means.

In yet another aspect, the present invention provides a private information management method including acquiring experience information pertinent to an event experienced by a user; adding private information, privately needed by the user, to the experience information acquired; generating predictive information inferable from the experience information and the private information; putting the experience information, the private information and the predictive information for enabling retrieval to store the three information thus put into order therein; and retrieving the fitting information from the empirical information, the private information and the predictive information thus stored, based on a retrieving condition input by the user, to present the information retrieved.

With the private information storage device, according to the present information, it is possible to store the private information as well as the information pertinent to an event experienced by the user, in such a manner as to remind the user of the experience of the event.

Moreover, with the private information storage device, according to the present invention, the user may be reminded of the event, he/she experienced in the past, while the information pertinent to an unexperienced event may be predicted from the experienced event and presented to the user. Thus, the retrieval may be made with higher responsiveness than is possible with keyword retrieval on the network. The processing of selecting the desired information from the extracted information is efficacious and highly useful for individuals.

The present invention proposes a scheme of storing the information pertinent to the event experienced by the user and the information needed by the user for utilization later on. In a concrete example of the present invention, the information needed by the user is termed the private information. The user's private information is a mark applied for comprehensibly indicating the information acquired and desired to be used again, or an evaluation value pertinent to the acquired information, and is entered in association with the information pertinent to the event experienced by the user.

According to the present invention, the date and time of a user's experience, as well as the image and the speech then recorded, are stored as the information pertinent to the event experienced by the user. The additional information as entered by the user in connection with the experienced event is handled as the private information. For example, if a user has purchased a certain commodity, the information on the date/time of purchase or the position of the store where the commodity was purchased, represents the information on the experienced event, whilst the user's impression or the lesson, obtained form the experience, such as the evaluation on the site of the store, on the services rendered or on the purchased commodity, or the grounds for such evaluation, and which is entered as 'memoranda', represents the user's private information.

According to the present invention, even if an event has not been experienced by a user, the information pertinent to such event may be generated and stored. For example, the present invention is featured by the fact that, if the weather was bad when the user visited a certain place, such that the comprehensive evaluation was bad, it is inferred that, if the weather was "good", such comprehensive evaluation will have been higher, so that such data as weather "good" and "comprehensive evaluation" are generated and rendered available. Thus, according to the present invention, the experience information, the private information, the predictive information generated from the two information, the user's impression on the experience, cases of success and failure, or the information tantamount to the lesson, are stored, along with the experience information, as the marks or evaluation values are annexed for use later.

For exploiting the stored information, it is sufficient that the user inputs the retrieving conditions. By so doing, the information on past analogous experiences, if any, and/or the information analogous to the predicted information, if any, may be taken out. For example, if the user visited the same place in the past, the private information, such as the data and time of the visit, the information on e.g. the commodities then purchased and the evaluation then given, are presented. Moreover, the information that, although the evaluation then given was not bad, the evaluation will be better if the condition is changed, if there is any such information, is presented.

According to the present invention, the information pertinent to the event experienced by the user and the information inferred from the experienced event are stored. Since it is sufficient that the information is presented from storage means which may be retrieved later by a keyword, the device of the present invention may be such a one in which the storage means is provided on the network. Although the information derived from the experiences of the individual users may be designed to be used solely by the user in person, the information derived from the experiences of the individual users may also be co-owned by other users.

BRIEF DESCRIPTION OF THE DRAWINGS

FIG. 4 illustrates an example of the current information acquired in the information exploitation phase in the private information management device.

FIG. 5 illustrates the predictive information inferable from the event experienced by the user in the data processing unit in the private information management device.

FIG. 6 similarly illustrates the predictive information inferable from the event experienced by the user in the data processing unit in the private information management device.

FIG. 9 illustrates an example of the experience information acquired in the private information management device.

FIG. 10 illustrates an example of the experience information acquired in the private information management device.

FIG. 11 illustrates an example of the current information acquired in the information exploitation phase in the private information management device.

FIG. 12 illustrates an example of the retrieval conditions entered in the information exploitation phase in the private information management device.

FIG. 13 illustrates an example of data used as the retrieval condition in the private information management device.

FIG. 14 illustrates an example of data displayed as the retrieved result in the private information management device.

DESCRIPTION OF THE PREFERRED EMBODIMENTS

Figure 1:
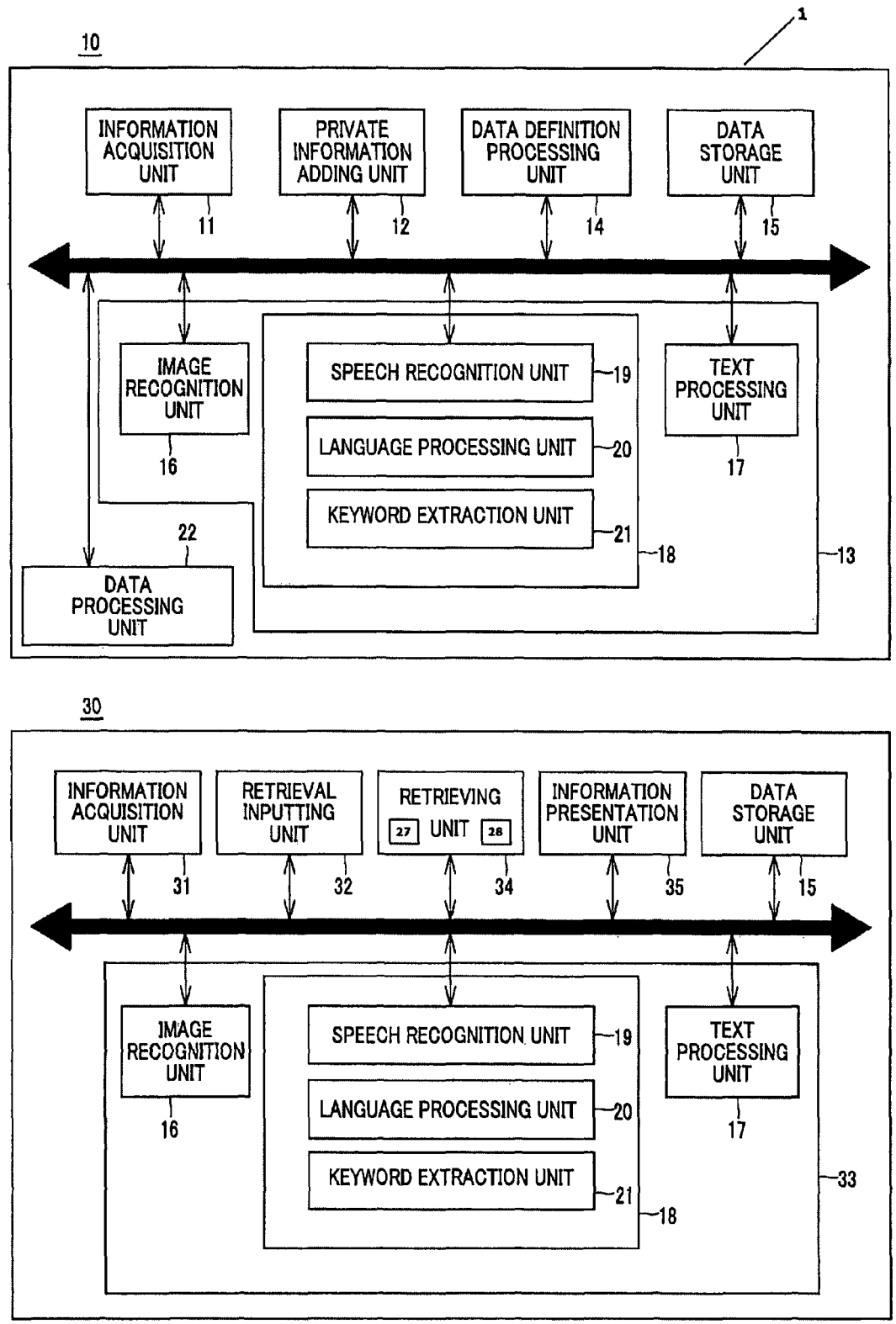
FIG. 1 is a block diagram for illustrating a private information management device as a preferred embodiment of the present invention.

FIG. 1 shows schematics of a private information management device 1, shown as a concrete example of the present invention. The private information management device 1 includes an information registration unit 10 for the information registration phase pertinent to information inputting, a means for storing these information, and an information exploitation unit 30 pertinent to information outputting for the information exploitation phase exploiting the so acquired information later.

The private information management device 1 includes, as the information registration unit 10, an information acquisition unit 11 for acquiring the information pertinent to an experienced event, a private information adding unit 12 for adding the private information, a data recognition processing unit 13 for recognizing the acquired information, a data definition processing unit 14 for classifying the recognized data in accordance with the predetermined definition, and a data storage unit 15 for storage of the data classified according to the definition.

The information acquisition unit 11 is a means for acquiring the information around the user, and includes a means capable of acquiring the image information, speech information, position information and time/date, such as a camera, microphone or GPS. The data recognition processing unit 13 performs the processing of extracting the specified information from e.g. the image information, speech information, position information or time/date, as acquired by a camera, microphone or GPS. The data recognition processing unit 13 includes an image recognition unit 16, a text processing unit 17 and a speech processing unit 18. The image and the text of the image data acquired from the camera is subjected to image recognition processing and text recognition processing, by the image recognition unit 16 and the text processing unit 17, to extract specified image and text data. The speech data acquired from the microphone is processed by a speech recognition unit 19 to recognize the speech. The speech information is converted into text data by a language processing unit 20, and key data is extracted from the converted text data by a keyword extraction unit 21.

The data extracted by the data recognition processing unit 13 is classified in the data definition processing unit 14 in accordance with predetermined definitions. Examples of the definitions include an image of a person, the identification information pertinent to the image of the person, such as family, brothers/sisters, spouse, place of work, friends, age groups, place of residence or nationality, the degree of density as verified from image data (low or high), sort of the building, as verified from image data (sort of the service works, as may be surmised from placards), name of the buildings (letter/character strings), time/date, weather (fine, rainy or cloudy), atmospheric temperature (high or low), humidity (high or low), wind (strong or weak), position information (latitude, longitude or altitude), closest station, common name that may be understood only by the user, evaluation value and items of evaluation (conditions of site, evaluation of the salespeople, evaluation of goods, atmosphere of store, pricing, time of supplying cooking and other conditions). The acquired data are classified based on these definitions. The data storage unit 15 holds the data classified based on the above definitions.

A data processing unit 22 generates the experience information not actually experienced by the user but which is pertinent to the experienced event, and the predictive information, which may be inferred from the private information as input by the user, puts the experience information, private information and the predictive information into order such as to enable the retrieval, and causes the three information sorts in storage means. As an example, the private information is the 'value' imparted to the experience information pertinent to the event experienced by the user. The data processing unit 22 generates predicted values for the evaluated values, imparted from the user, on the occasion of the condition changes, as the predictive information.

The case of exploiting the private information of the user, registered in the information registration unit 10, is hereinafter explained.

The private information management device 1 includes, as the information exploitation unit 30, an information acquisition unit 31, for acquiring the current state, a retrieval inputting unit 32, supplied with the retrieving conditions, a data recognition processing unit 33 for recognizing the acquired information, a retrieving unit 34 for extracting the information conforming to the retrieving conditions or the analogous information from the data storage unit 15, and an information presenting unit 35 for presenting the extracted information to the user.

The information acquisition unit 31 and the data recognition processing unit 33 acquire and recognize the position information of the current site, and the other information, by a method similar to that of the information registration phase. The retrieval inputting unit 32 is supplied with the retrieving conditions by the user. The inputting methods include the speech input, text input or the image input. In case the speech is input to the retrieval inputting unit 32, the data recognition processing unit 33 extracts the keyword pertinent to the time, site and the person from the text. In case the text data is input to the retrieval inputting unit 32, the data recognition processing unit 33 extracts the keyword from the text and, in case the image data is input to the retrieval inputting unit 32, the data recognition processing unit 33 extracts the keyword from the image. The data recorded in schedule management software may also be used.

The retrieving unit 34 includes a presentation data inferring unit 27, for extracting the information, analogous to the retrieving conditions, from the data storage unit 15, and a presentation data retrieving unit 28, for extracting the information matched to the retrieving condition, from the data storage unit 15. In retrieving the information from the data storage unit 15, the database management system, used in the information registration unit 10, is used for retrieval. The information extracted by the retrieving unit is presented to the user by the information presenting unit 35 by the text data, audio guide, or the image display, taken alone or in combination.

In connection with an event experienced by the user, the present private information management device 1 is able to store the information pertinent to the experience, and the private information, such as to remind the user of the experience. Moreover, the private information management device 1 is able to predict the information on an unexperienced event, from the event directly experienced by the user, and hence is able to store the information which is in excess of the information corresponding to the actual experience of the user. Additionally, since the information being retrieved is the information collected on the basis of the user's experience, the information of higher utility for a user may be taken out with responsiveness and efficiency higher than with a technique of keyword retrieval over a network, while the desired information may be efficaciously selected from the extracted information, thus allowing taking out the information of high utility and efficiency.

The present invention is also featured by the fact that the registrant in person exploits the information managed by the private information management device 1. For this reason, the information obtained from the experience of the user, or the private information, such as impression, evaluation or lesson for the experienced event, does not have to be generalized, but may be recorded in a form that may be understood solely by the user. It is preferable that the information pertinent to the experienced event is automatically acquired by the camera, microphone or the GPS, as far as is possible, as in the example described above. The private information management device 1 according to the present invention is desirable under the circumstances that, in actuality, the user feels it difficult to leave a 'memorandum' consciously in connection with an event experienced by the user, and is liable to lose the chance of recording the crucial information, such that, if similar chance presents itself again, it is not possible to take advantage of the previous experience.

Figure 2:
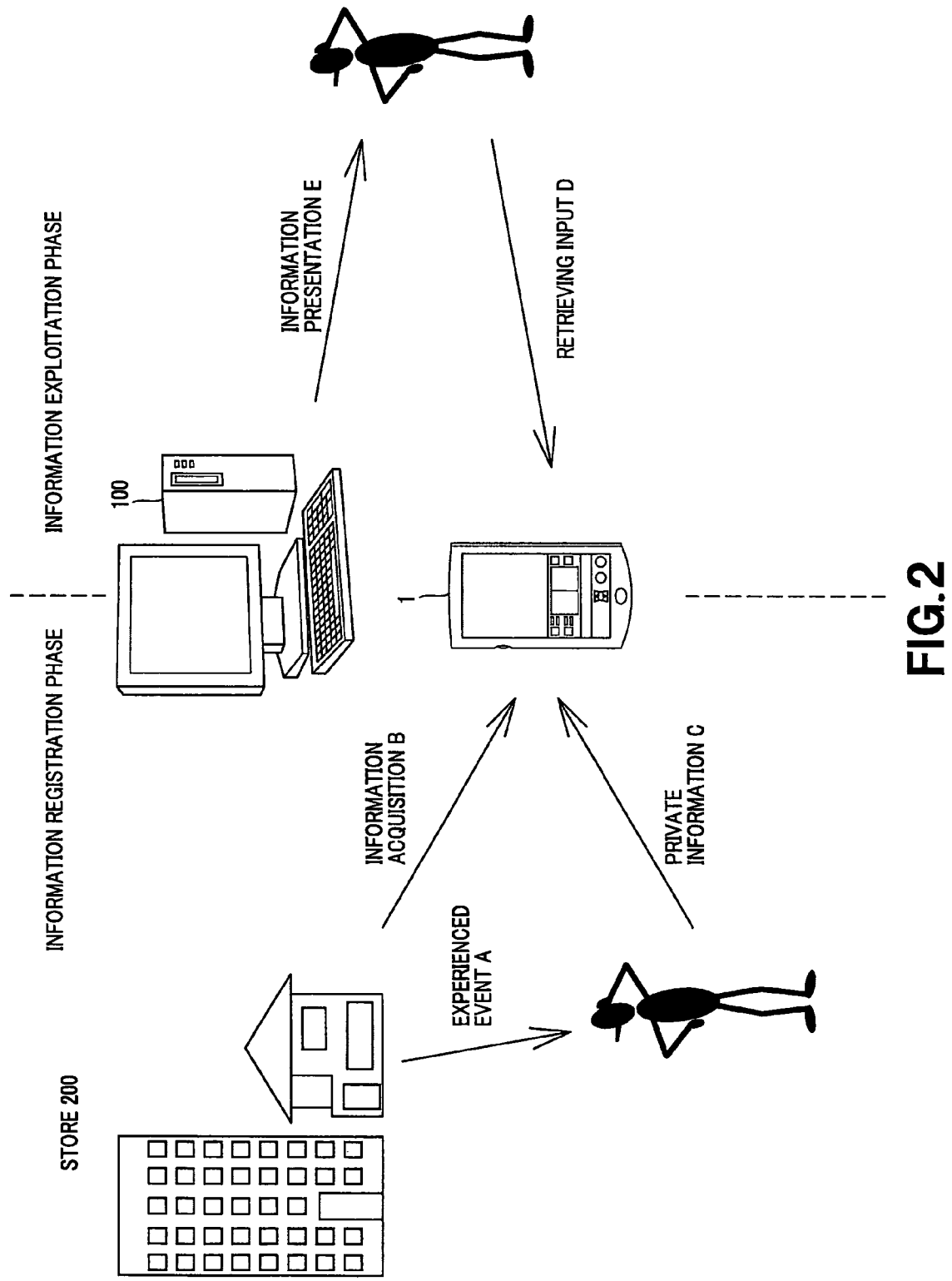
FIG. 2 illustrates private information management employing the private information management device shown as a concrete example of the present invention.
Figure 3:
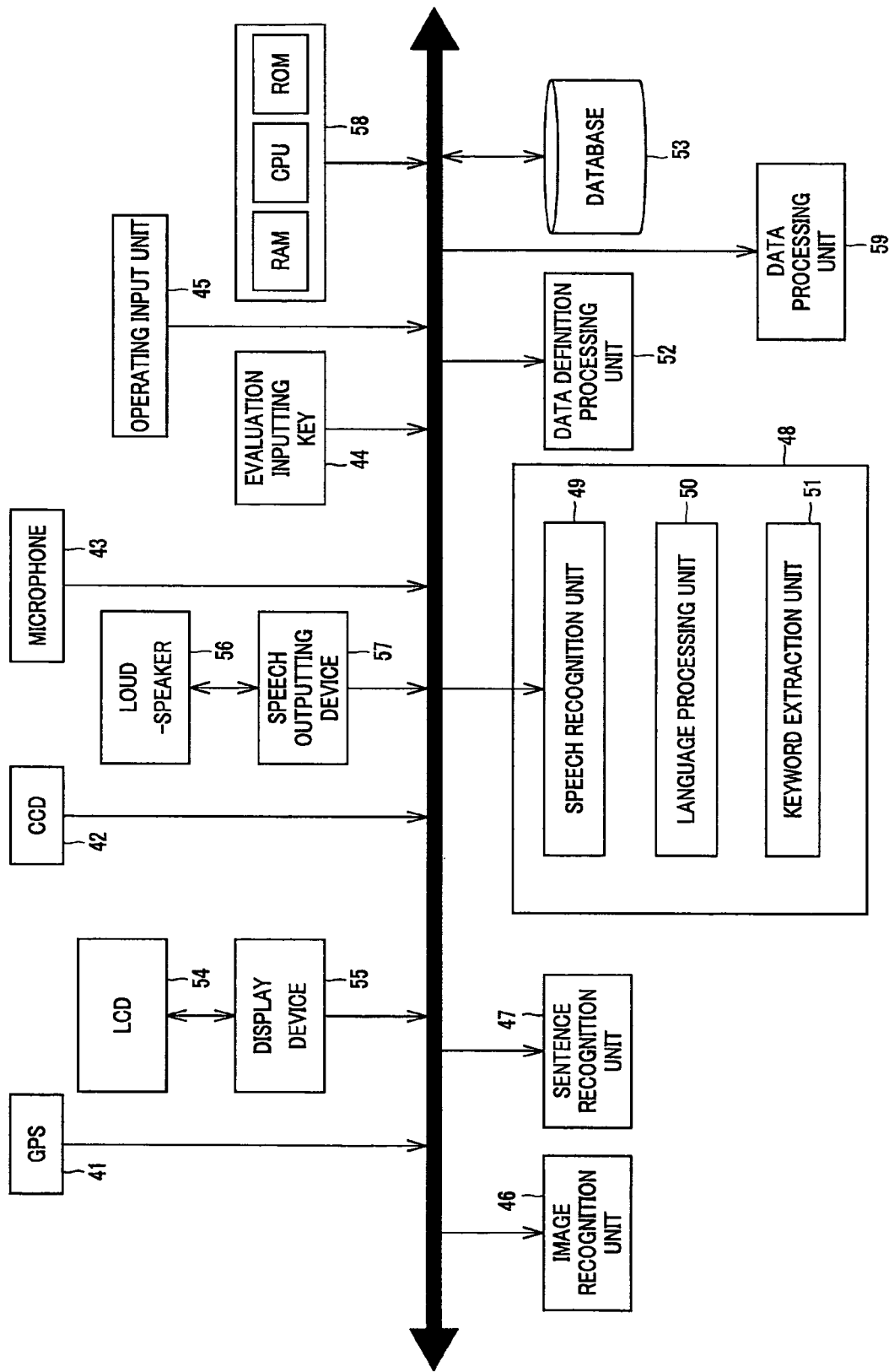
FIG. 3 illustrates the structure of the private information management device.

Referring to FIGS. 2 and 3, the private information management device 1, as a concrete example of the present invention, is explained in detail. FIG. 2 separately shows the information registration phase and the information exploitation phase, both of which are carried out using the private information management device 1. FIG. 3 shows a specified example of the private information management device 1. In the present concrete example, the case of a user having a meal in a restaurant (store) is explained. Consequently, the information registration phase is the phase of registering the information of the surrounding in the user having a meal in a restaurant, and the private information at this time, while the information exploitation phase is a phase of taking out the past information pertinent to the restaurant at the next chance.

Since it is crucial for a user experiencing an event to be carrying the private information management device 1, the private information management device 1 in the present concrete example is of the mobile type. Even though the private information management device is of the mobile type, it may be connectable to a device corresponding to e.g. a stationary PC 100 or a server device for household use so that the information acquired may be stored therein. In this case, it is sufficient that the data storage unit 15 of the private information management device 1 is provided independently on the side of the stationary PC 100 or of the server device so that the information will be transmitted/received wirelessly or over a wired communication interface between data storage unit and the main body unit of the private information management device 1.

Referring to FIG. 3, the private information management device 1 includes a GPS 41 for acquiring the position information, a CCD (charge coupled device) 42 for acquiring the information around the user, and a microphone 43. These components serve as the information acquisition unit 11 for the information registration phase and as the information acquisition unit 31 for the information exploitation phase, shown in FIG. 1. In this private information management device 1, image data and voice data are automatically acquired, without operations by the user. The CCD 42 and the microphone 43 transfer to a mode of generating and storing storage form data, based on a data model, at a preset time interval, or with changes in the environment around the user, for storing the data. For example, detection of a large sudden sound, or detection of a keyword specified by a keyword extraction unit 51, is used as a trigger for information acquisition. In the explanation of the present concrete example, the information around the user, acquired by the information acquisition unit 11, is termed the experience information, as necessary.

The private information management device 1 also includes an evaluation inputting key 44, as a private information addition unit 12 for the user to add the private information, and an operating input unit 45 for a retrieval input in the information exploitation phase or for an operating input for this device. The evaluation inputting key 44 may be a simple pushbutton for inputting points corresponding to the number of times of pressing operations, or an operating input key, such as a ten-key, capable of directly inputting the evaluation values. In the present concrete example, the evaluation of 'best', 'acceptable', 'good', 'bad' and 'worst' is given, depending on the number of times of the pressing operations. The evaluation input from the evaluation inputting key 44 does not necessarily have to be entered simultaneously with the experience of the user. That is, the evaluation input may be made, in connection with the experienced event, at a time later than the time of the information acquisition.

The private information management device 1 may be provided with a structure for acquiring the weather information, such as atmospheric temperature, humidity or weather, as a structure corresponding to the information acquisition unit 11, in addition to the above-described structure. The technique for acquiring the position information or the weather information may be exemplified by having the position information or the weather information periodically distributed in addition to receiving the base station information periodically transmitted from the base station, as is already realized in the field of a mobile phone. The private information management device 1 may also be provided with a simple temperature or humidity sensor.

The private information management device 1 includes an image recognition unit 46, a sentence recognition unit 47 and a speech recognition unit 48 for recognizing the image data, sentence data and speech data acquired, respectively. The image recognition unit 46 executes image recognition processing on the image data acquired from the CCD 42. For example, it executes the processing of recognizing and extracting a face portion of a person. The sentence recognition unit 47 executes text recognition processing on image data acquired from the CCD 42. For example, it executes the processing of recognizing letter/character strings or symbols in the image, such as letters/characters in a placard, to extract the name of the building or the sign as text data. The speech recognition unit 48 includes a speech recognition processing unit 49, a language processing unit 50, and a keyword extraction unit 51. The speech recognition processing unit 49 recognizes and processes speech data acquired from the microphone 43 as speech. The language processing unit 50 converts the speech data into text data, and the keyword extraction unit 51 extracts the key word from the as-converted text data.

The private information management device 1 also includes a data definition processing unit 52 for giving definitions to the data extracted by the image recognition unit 46, sentence recognition unit 47 and the speech recognition unit 48. The data definition processing unit 52 is equivalent to the data definition processing unit 14 for the information registration phase and to the retrieving unit 34 for the information exploitation phase, and classifies the extracted data in accordance with the predetermined definitions or retrieves the information from a database 53 in accordance with the retrieving conditions.

In the database 53 of the private information management device 1, there are registered, for example, image data and text data stating the information pertinent to the image data. For example, for image data of a face of a person, there are stored names, addresses, sites of contact or ages of friends in associated manner. There is also stored the information of families, brothers/sisters, spouse, people in the place of work, friends, and so forth, if any, that are pertinent to this person. The persons, sorts or names of the buildings (letter/character strings), as determined from image data, text data and speech data, extracted by the image recognition unit 46, sentence recognition unit 47 and the speech recognition unit 48, are compared to data stored in the database 53, so as to be classified and stored as new data. Among the definitions, there are, for example, the position information (latitude, longitude or altitude), time/date data, weather information (fine, rainy or cloudy), atmospheric temperature (high or low), humidity (high or low), wind (strong or weak), closest station, common names that may be understood only by the user, evaluation values and items of evaluation (conditions of site, evaluation of the salespeople, evaluation of goods, atmosphere of store, pricing, time of supplying cooking and other conditions). The acquired data are classified based on these definitions.

The private information management device 1 also includes a data processing unit 59 corresponding to the data processing unit 22 shown in FIG. 1. The data processing unit 59 generates the predictive information inferable from the private information and the experience information extracted by the above components and which have been defined by the data definition processing unit 52. Specifically, the data processing unit 59 is provided with predicted evaluation values corresponding to the evaluated values which were afforded by the user on the subjects of evaluation exemplified by the conditions of site, salespeople, commodities, atmosphere of the store, price setting, cooking presenting time and so forth, and which will prevail in case the conditions have changed. That is, if the evaluation values are set in five stages and the value of "1" is afforded as the private information, it is set to "5", as an example, whereas, if "−3" is afforded for the setting of "−5 to +5", it is set to "3", and the new evaluation value obtained here is used as the predictive information.

FIG. 4 shows data extracted from the private information and the experience information acquired. It is assumed that, although data is entered only insofar as it is necessary for explanation, for convenience, data are also entered in the void cells. The evaluation here is given by five stages of 'best', 'acceptable', 'good', 'bad' and 'worst'. FIG. 5 shows the predictive information generated by the data processing unit 59 on the assumption that the weather is good. Since the conditions for site are bad in the case of FIG. 5, it may be inferred from the predictive information that, if the weather is good, the comprehensive evaluation may be better despite the bad conditions for site. FIG. 6 shows the predictive information for different time zones. The information indicates that, if the time zone is the night, the atmosphere may be best.

The predictive information may be automatically generated by the data processing unit 59. The user may be prompted to make input as the guide as to what will be the atmosphere under certain and certain conditions is presented to the user by e.g. the software processing.

The data acquired and defined are model-converted, in accordance with a data model, and stored in the database 53, using a database management system (DBMS). Examples of the techniques for model conversion include the technique consisting in defining the data in a tabulated form and managing the tabulated data in accordance with the DBMS with use of a relational database (RDB), and a technique of classifying the data using the RDFs-OWL and managing the so classified data in accordance with the DBMS with use of RDFDB or XMLDB. The information pertinent to the event experienced by the user, or the private information, stored in the database 53, may be edited later, if so desired by the user.

The private information management device 1 also includes, as a structure for presenting the information to the user, an LCD 54, as display, a display device 55, a loudspeaker 56 and a speech outputting device 57.

The above-described structures are comprehensively controlled by a CPU, a ROM having stored therein e.g. processing programs, and a controller 58, provided with a RAM, as a work area for the CPU.

Figure 7:
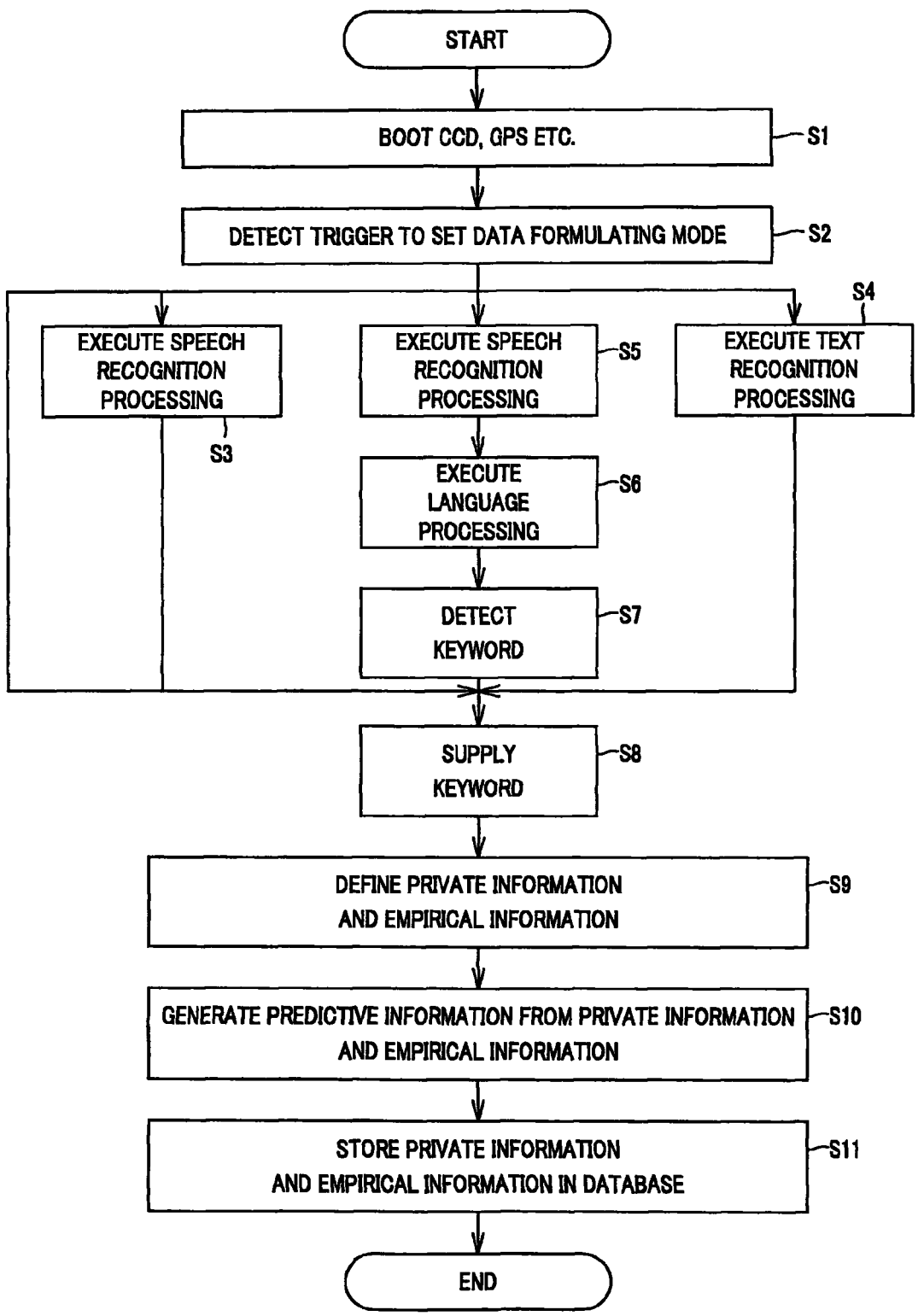
FIG. 7 is a flowchart for illustrating information registration processing in an information registration phase in the private information management device.
Figure 8:
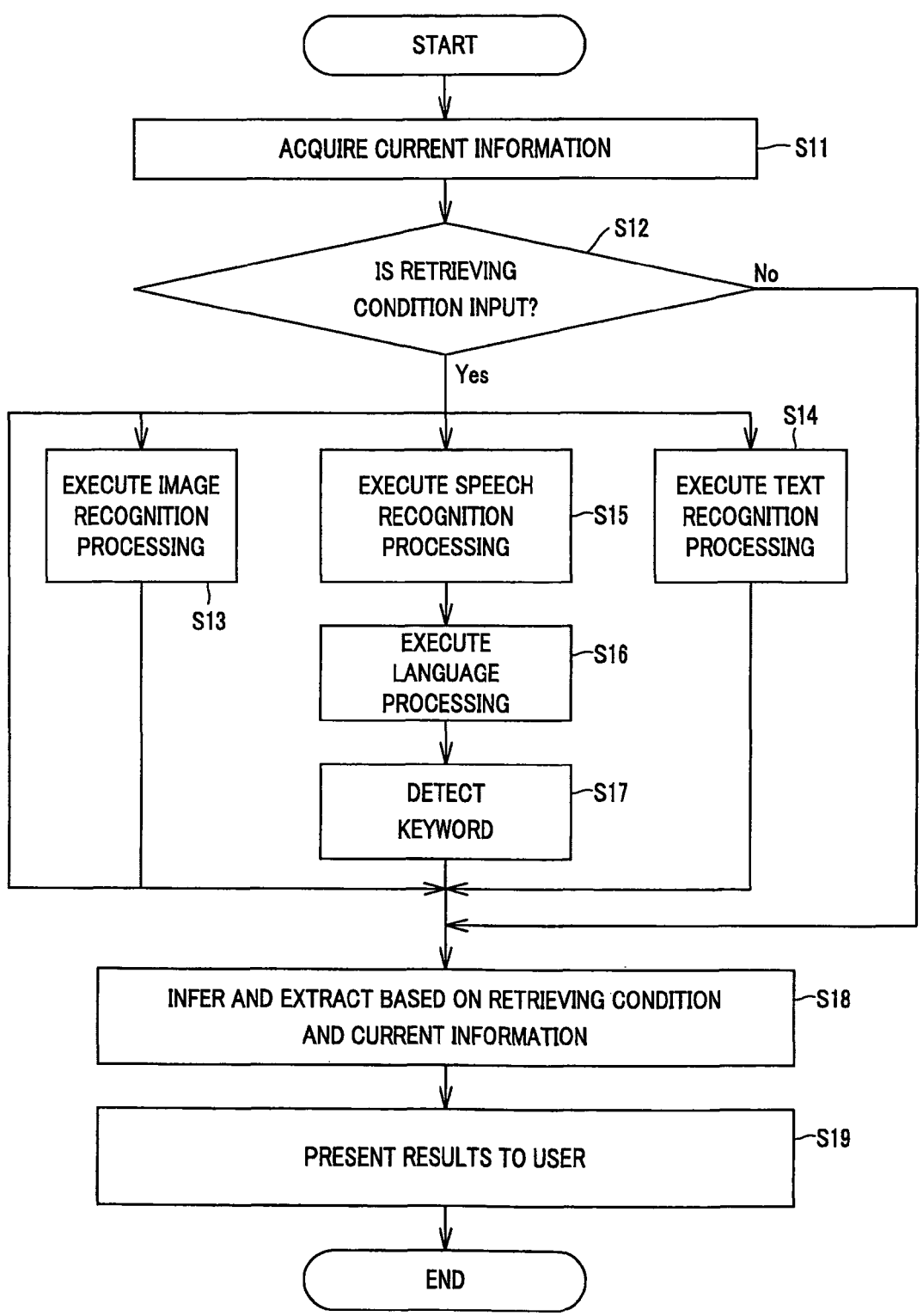
FIG. 8 is a flowchart for illustrating information extraction processing in an information exploitation phase in the private information management device.

Referring to FIGS. 2, 7 and 8, the case of registering the information pertinent to the experienced event (experience information) and the private information, by a user, with the aid of the aforementioned private information management device 1, is hereinafter explained. FIGS. 7 and 8 illustrate the information registration processing for a case where a user has a meal in a restaurant (store) and the information exploitation processing of subsequent exploitation of the registered information, respectively.

First, the case where the user acquires the experience information in a restaurant 200 and the private information, is explained. When the user, carrying the aforementioned private information management device 1, takes a meal in the restaurant 200 (arrow A in FIG. 2), the information pertinent to the experienced event is acquired by the private information management device 1 (arrow B in FIG. 2). The information acquired here is classified into the experience information and the private information. The experience information is mainly acquired automatically by the private information management device 1. The private information is entered by the user (arrow C in FIG. 2). It is noted that the private information may or may not be entered simultaneously with the acquisition of the information pertinent to the experienced event.

As for the timing of the acquisition of the experience information, it is sufficient if the user sets the mode of automatically acquiring the information at a preset interval before walking into the restaurant 200. However, in a usual case, the user cannot consciously execute this mode setting operation. According to the present invention, the information pertinent to the experienced event is desirably acquired without the user becoming conscious about it, and hence the experience information is to be acquired automatically, with changes in the surrounding states as a trigger, as far as is possible. For example, if a sentence "May I help you?" is defined at the outset, as a keyword for trigger, the data formulating mode is entered when the user steps into the restaurant 200 and the private information management device 1 has detected the sentence "May I help you?" operating as a trigger (steps S1 and S2 of FIG. 7).

FIG. 9 shows an example of the experience information acquired at this time. If the time information acquired is 2003, Jul. 22, 17:30, it is registered as "200307221730", while the position information is expressed as "605958, 1354536, 546) (60°59'58" latitude, 135°45'36" longitude and 546 m altitude). Additionally, the information on attendant states, such as the weather information, transmitted from the base station, is annexed. Moreover, if there is any fact that has become apparent from the information acquired before acquisition of the experience information, such information is also annexed. In the present concrete example, this information is that pertinent to the accompanying person(s). The time information, acquired here, may be the correct time information, contained in the GPS data, or may e.g. be "2003/07/22 night" or may be an abstract expression, such as "daytime", "night", "holiday", or "workday". The position information may be a station name, a building name, a name of establishment or a common name accustomed to the user, because these names may be taken out as more intelligible and user friendly information when the user performs retrieval in the information exploitation phase.

FIG. 10 shows an example of the private information as entered by the user. The private information is the overall evaluation, conditions of site, evaluation of the salespeople, evaluation of goods, atmosphere of store, pricing, time of supplying cooking and the more detailed evaluation on other conditions. Each evaluation may be recorded by the number of points actually entered by the aforementioned pushbutton type input keys.

The timing for the user to enter the private information (arrow C in FIG. 2) may be arbitrary, as described above. The private information may be added later to the acquired information. In the present concrete example, the user may be prompted to input the private information by generating the sound or by vibrations when the user has finished the experience in the restaurant 200, that is, when the user has moved from this restaurant to another place. There may, of course, be provided a mode which allows for acquisition of the experience information or for inputting of the private information on the part of the user.

If, when the private information management device 1 has booted the CCD or the GPS in a step S1, and is in a standby state, a trigger is detected, the private information management device 1 in a step S2 moves to a data formulating mode, and acquires the experience information. The experience information, acquired in a step S2, is recognized and processed as from a step S3. If the experience information acquired is image data, the image recognition processing is carried out on image data acquired from the CCD 42 in a step S3. If the experience information acquired is the image data, and the letter/character information is contained in the image, the sentence recognition unit 47 in a step S4 executes text recognition processing on image data acquired from the CCD 42, and recognizes the letter/character string, in the image, such as the letters/characters of e.g. a placard, and extracts the name of the building or the sign as text data. If the experience information acquired is the speech data, the speech recognition processing unit 40 in a step S5 performs speech recognition processing on the acquired speech data. Then, in a step S6, the language processing unit 50 converts the speech information into text data and, in a step S7, the keyword extraction unit 51 extracts the keyword from the text data. The GPS data, acquired by the GPS 41, such as the position data or the date/time data, and the text data, entered by the information presenting unit 35, may directly be used, and hence the private information management device 1 proceeds to the next step.

In a step S8, the private information management device 1 accepts the inputting of the private information from the user. At this time, the information that could not be acquired as the experience information, such as the store name or store site, is entered simultaneously by the user. However, the private information does not have to be entered at this stage. The mode for the user to input only the private information is also provided. The data obtained from the acquired information are classified in a step S9 in accordance with the definitions.

The private information management device 1 in a step S10 generates the predictive information inferable from the private information and the experience information acquired. Data as the predictive information is also classified based on the definitions. Data obtained from the information acquired and data as the predictive information are ultimately stored in a step S11 in the database 53.

By the above processing, the experience information and the private information of the user are put into order and stored in the database 53 in such a manner as to permit facilitated retrieval. Thus, the above information, obtained through actual experience by the user, may be stored.

The case of exploiting the user's private information, registered in the information registration unit 10, is now explained with reference to FIGS. 2 and 8. Here, the case of the user retrieving the information pertinent to restaurants is explained.

The private information management device 1 is supplied with information retrieval conditions (arrow D in FIG. 2). The retrieval conditions supplied may be automatically selected, with the keyword, contained in the information, derived from the user's current state, as acquired by the private information management device per se, as a retrieving key. In addition, the conditions directly entered by the user may be used. Among the techniques for a user to input the retrieving conditions, there are such techniques by manual inputting, from item to item, based on the GUI for inputting the retrieving conditions, by speech input in keeping with the guidance, and by simple utterance of the keyword. In the following, the case in which the retrieving condition is input from the user by speech is explained.

In a step S11, the private information management device 1 acquires the position information of the current site, and the other information, by a method similar to that for the information registration phase. In the next step S12, it is verified whether or not the retrieval condition has been entered. If the retrieval condition has been entered by the user, the keyword is extracted, depending on the inputting method. In case the user has entered the retrieval condition by speech, for example, in case the user has uttered "restaurant with amicable atmosphere" to the private information management device 1, the speech recognition unit 48 executes the speech recognition processing, and extracts the keywords "atmosphere", "amicable" and "restaurant".

The position information of the current site, acquired at this time, and the other information, are referred to below as the current information. FIGS. 11 and 12 show the current information acquired in the step S11 and the retrieval condition acquired in the step S12, respectively. In association with the numbers of the acquired information, the time information for Aug. 31, 2003, 12:10 is represented as "200308311210", while the position information 58°59'20" latitude, 135°42'40" longitude and 520 m altitude is represented as "585920, 1354240, 520". In addition, the information pertinent to the attendant circumstances, such as the weather information, transmitted from the base station, for example, is acquired. The retrieval conditions, acquired by the private information management device 1, are "good" atmosphere and name of the place being the "restaurant", as shown in FIG. 12. Thus, these data are added to data used as the retrieval condition, such that the set of data shown in FIG. 13, including these data, becomes a keyword for the retrieval conditions.

The experience information, acquired in the step S12, is recognized and processed in the processing of a step S13 and in the following steps. If the information is the experience data, the image recognition processing is carried out on image data acquired from the CCD 42 in the step S13. If the information is the image data and the letter/character information is contained in the image, the sentence recognition unit 47 in a step S14 executes the text recognition processing on the image data acquired from the CCD 42. For example, the sentence recognition unit 47 executes the text recognition processing on image data acquired from the CCD 42, and recognizes the letter/character string or the symbol in the image, such as letters/characters in a placard, to extract the name of the building or the sign as text data. If the information is speech data, the speech recognition processing unit 49 in a step S15 performs speech recognition processing on the acquired speech data. In the next step S16, the language processing unit 50 converts the speech information into text data and, in the next step S17, the keyword extraction unit 51 extracts the keyword from the text data. If the information is text data or GPS data, processing transfers directly to the next step 18. If no retrieval condition has been entered in the step S12 from the user, processing similarly transfers directly to the next step 18.

In the step S18, the information including the retrieval conditions and the information analogous with the retrieval conditions are extracted from the database 53, based on the current information extracted in the steps S12 to S17 and the retrieving condition entered by the user. For extracting the information retrieved from the database by the user, the database management system used in the information registration unit 10 is used. For example, memory base reasoning (MBR) and the distance between two points (Euclid distance) is used. As for the retrieving method, if such a case is found in which all items of the information stored in the database are available, the evaluation values for the experience entered by the user are prioritized, whereas, if the totality of the items are not available, priority is placed on the items with a higher degree of matching. The information of other experiences, having evaluation values as specified by the retrieving conditions, input by the user, may also be retrieved.

The information extracted by the data definition processing unit 52 as the retrieving unit is presented in a step S19 to the user by text data, voice guide, image display, or combination thereof (arrow E in FIG. 2).

If the retrieving condition has been input by the user in the step S11, retrieval is carried out based on the keyword of the retrieving condition. If the retrieving condition has not been input, retrieval is carried out under a condition analogous to the current information. For example, if the current place is the restaurant, and the user visited this restaurant in the past, the result of evaluation at such past time is presented. If the user did not visit this restaurant in the past, the information on a near by restaurant the user visited in the past is presented. If no retrieving condition has been entered, but the current time is the meal time, the information on the restaurant near the user's current site is presented.

A data example, displayed as being the result of retrieval, is shown in FIG. 14. Retrieved results 001, 002, 003, 004 and 005 are displayed against the input current information and retrieving conditions. Of these result data, the results 001 to 004 are the information obtained by experiences by the user. The result 005 is the data shown in FIG. 6. If the time is the evening later than 18.00, both the atmosphere and the evaluation are the "best".

As for the display order, the contents of the retrieving conditions by the user are prioritized. For example, if the "closeness" is input by the user, the information of restaurants which are close to the current site is prioritized over the information of restaurants having a high evaluation.

With the present technique, data recorded in the schedule management software may be used. For example, if the user is scheduled to visit a certain place at a certain time on a certain date, and this schedule is registered in the schedule management software, it is possible to extract the optimum route from the database 53 and the start target time, from the database 53, for presentation to the user in advance.

Thus, the present private information management device 1, as described above, is able to store the information, experienced by the user, along with the information reminiscent of the experience. Since the information obtained on retrieving the data storage unit of the present device is the information once experienced by the user, the information obtained on retrieving the data storage unit by the present device is efficacious and of high utility as compared to the information obtained by the technique of keyword retrieval on the network, such as the Internet. Moreover, the information reminds the user of the event he/she experienced in the past, and hence is more realistic than the generalized information obtained on retrieval on the network.

What is claimed is:

1. A private information storage device comprising:
   at least one information acquisition component of the private information storage device comprising at least a camera for acquiring image information on an environment around a user experiencing an event and a microphone for acquiring audible information on the environment around the user experiencing the event;
   at least one data recognition component for processing at least the image information and the audible information to obtain experience information pertinent to the event;
   at least one private information adding component of the private information storage device for adding by the user private information, privately needed by the user, to said experience information, wherein the private information includes at least one evaluation value of a plurality of evaluation values assigned by the user to the experience information pertinent to the event experienced by the user and reflecting a degree of satisfaction of the user with the event;
   at least one information inferring component of the private information storage device for generating predictive information inferable from said experience information and said private information comprising the at least one evaluation value; and
   at least one storage component in memory of the private information storage device for putting the experience information, the private information and the predictive information into order and for storing the experience information, the private information and the predictive information in a manner which enables retrieval of the experience information, the private information and the predictive information.

2. The private information storage device as defined in claim 1 wherein:
said at least one information inferring component affords a predicted value of said at least one evaluation value in case a condition for said at least one evaluation value has changed.

3. The private information storage device as defined in claim 1 wherein:
said at least one information acquisition component includes at least one speech data acquisition component for acquiring outside speech data and at least one speech recognition component for recognizing a pronunciation of a specific word from said outside speech data; and
said at least one storage component puts into order and stores a result of recognition by said at least one speech recognition component, said experience information, said private information and said predictive information in a manner which enables retrieval of the result of recognition by said at least one speech recognition component, said experience information, said private information and said predictive information.

4. The private information storage device as defined in claim 1 wherein:
said at least one information acquisition component includes at least one image data acquisition component for acquiring outside image data and at least one image recognition component for recognizing a specific image from said outside image data; and
said at least one storage component puts into order and stores a result of recognition by said at least one image recognition component, said experience information, said private information and said predictive information in a manner which enables retrieval of the result of recognition by said at least one image recognition component, said experience information, said private information and said predictive information.

5. The private information storage device as defined in claim 1 wherein:
said at least one information acquisition component includes at least one sentence data acquisition component for acquiring sentence data and at least one sentence recognition component for extracting a specific word from the sentence data; and
said at least one storage component puts into order and stores a result of recognition by said at least one sentence recognition component, said experience information, said private information and said predictive information in a manner which enables retrieval of the result of recognition by said at least one sentence recognition component, said experience information, said private information and said predictive information.

6. The private information storage device according to claim 1, wherein the experience information comprises at least one of a weather, an atmospheric temperature, and a humidity.

7. The private information storage device according to claim 1, further comprising at least one of a temperature sensor and a humidity sensor.

8. The private information storage device according to claim 1, wherein the event comprises visiting a restaurant by the user.

9. The private information storage device according to claim 1, wherein the event comprises visiting a store by the user.

10. The private information storage device according to claim 1, wherein the at least one image data acquisition component comprises a charge coupled device.

11. A method for storing private information comprising:
in response to a predetermined trigger, acquiring information on an environment around a user experiencing an event to obtain experience information pertinent to the event;
receiving user input for adding private information privately needed by the user to the experience information, wherein adding the private information comprises assigning at least one evaluation value of a plurality of evaluation values to the experience information pertinent to the event experienced by the user, and wherein the at least one evaluation value reflects a degree of satisfaction of the user with the event;
generating predictive information inferable from said experience information and said private information comprising the at least one evaluation value;
putting said experience information, said private information and said predictive information into order; and
storing said experience information, said private information and said predictive information in a manner which enables retrieval of said experience information, said private information and said predictive information.

12. The method for storing private information according to claim 11, wherein adding the private information privately needed by the user comprises receiving user input from the user providing the private information.

13. The method for storing private information according to claim 11, wherein acquiring the information on the environment around the user comprises acquiring the information using at least a global positioning system and a charge coupled device.

14. A private information management device comprising:
at least one information acquisition component comprising at least a camera and a microphone of the private information management device for acquiring, upon an audible trigger received from an environment, information on the environment around a user experiencing an event;
at least one data recognition component for processing the information on the environment to obtain experience information pertinent to the event;
at least one private information adding component of the private information management device for adding private information, privately needed by a user, to said experience information, wherein the private information includes at least one evaluation value of a plurality of evaluation values assigned by the user to the experience information pertinent to the event experienced by the user and reflecting a degree of satisfaction of the user with the event;
at least one information inferring component of the private information management device for generating predictive information inferable from said experience information and said private information;
at least one storage component in memory of the private information management device for putting said experience information, said private information and said predictive information into order and for storing the information in a manner which enables retrieval of said experience information, said private information and said predictive information;

at least one retrieval inputting component of the private information management device for inputting a retrieval condition by said user;

at least one information presenting component of the private information management device for presenting information to said user; and at least one information retrieval presentation controlling component of the private information management device for retrieving fitting information from said experience information, said private information and said predictive information, based on the retrieval condition, and for presenting the fitting information to said at least one information presenting component.

15. The private information management device according to claim 14 wherein:

said at least one information inferring component imparts a predicted value of the at least one evaluation value in case a condition for said at least one evaluation value has been changed.

16. The private information management device according to claim 14 wherein:

said at least one information acquisition component includes at least one speech data acquisition component for acquiring outside speech data and at least one speech recognition component for recognizing a pronunciation of a specific word from the outside speech data; and said at least one storage component puts into order and stores a result of recognition by said at least one speech recognition component, said experience information, said private information and said predictive information in a manner which enables retrieval of the result of recognition by said at least one speech recognition component, said experience information, said private information and said predictive information.

17. The private information management device according to claim 14 wherein:

said at least one information acquisition component includes at least one image data acquisition component for acquiring outside image data and at least one image recognition component for recognizing a specific image from the outside image data; and said at least one storage component puts into order and stores a result of recognition by said at least one image recognition component, said experience information, said private information and said predictive information in a manner which enables retrieval of the result of recognition by said at least one image recognition component, said experience information, said private information and said predictive information.

18. The private information management device according to claim 14 wherein:

said at least one information acquisition component includes at least one sentence data acquisition component for acquiring sentence data and at least one sentence recognition component for extracting a specific word from the sentence data; and said at least one storage component puts into order and stores a result of recognition by said at least one sentence recognition component, said experience information, said private information and said predictive information in a manner which enables retrieval of the result of recognition by said at least one sentence recognition component, said experience information, said private information and said predictive information.

19. A private information management method comprising:

in response to a predetermined trigger, acquiring information on an environment around a user experiencing an event to obtain experience information pertinent to the event;

receiving user input for adding private information, privately needed by the user, to the experience information, wherein adding the private information comprises assigning at least one evaluation value of a plurality of evaluation values to the experience information, and wherein the at least one evaluation value is pertinent to the event experienced by the user and reflects a degree of satisfaction of the user with the event;

generating predictive information inferable from said experience information and said private information comprising the at least one evaluation value;

putting the experience information, the private information and the predictive information into order;

storing the experience information, the private information and the predictive information in a manner which enables retrieval of the experience information, the private information and the predictive information; and retrieving fitting information from the experience information, the private information and the predictive information, based on a retrieval condition input by said user.

* * * * *